United States Patent [19]

McGehee

[11] 4,106,643

[45] Aug. 15, 1978

[54] FERTILIZER SPREADER BOX

[76] Inventor: Wendyl B. McGehee, 309 Pawnee, Burns Flat, Okla. 73624

[21] Appl. No.: 780,023

[22] Filed: Mar. 22, 1977

[51] Int. Cl.² ............................................... B60P 1/38
[52] U.S. Cl. ............................... 214/83.36; 296/31 R; 220/72
[58] Field of Search ................... 214/83.36, 83.34, 518, 214/519, 520, 521, 522; 296/28 R, 28 M, 31 R, 31 P, 28 E; 220/1.5, 71, 72, 73

[56] References Cited

U.S. PATENT DOCUMENTS

| 2,466,923 | 4/1949 | Woodard | 214/83.18 |
|---|---|---|---|
| 2,493,451 | 1/1950 | Gaddis et al. | 214/83.36 |
| 2,710,683 | 6/1955 | McClenny, Jr. | 198/841 X |
| 2,866,538 | 12/1958 | Goldberg | 198/841 |
| 3,044,640 | 7/1962 | Jamison, Jr. | 214/83.36 |
| 3,482,717 | 12/1969 | Moser | 198/841 X |

*Primary Examiner*—Albert J. Makay
*Attorney, Agent, or Firm*—William R. Laney

[57] ABSTRACT

A box for containing and distributing fertilizer in dry pellet form comprising a frusto-pyramidal hopper including two end walls, two side walls and a bottom wall; a moving belt conveyor including an upper run passing over the bottom wall of the hopper and extending through openings in the hopper at the lower edges of each of said end walls; and a plurality of saddle plates supportingly connected to the outer sides of the two side walls of the hopper and extending downwardly therefrom. A pair of hydraulic fluid tanks extend along the lower edges of the side walls and are secured to the lower ends of the saddle plates. A plurality of transverse channel members are connected between the hydraulic fluid tanks and extend transversely across the hopper under the bottom wall thereof. A plurality of horizontally spaced, longitudinally extending supporting rods are positioned between the channel members and the bottom wall of the hopper to support the bottom wall on the channel members. Protective sealing flaps project downwardly from the lower portions of the side walls of the hopper and sealingly overlap the longitudinal edges of the conveyor belt.

25 Claims, 5 Drawing Figures

FERTILIZER SPREADER BOX

BACKGROUND OF THE INVENTION

1. Field of the Invention

This invention relates to container structures, and more particularly, to large hoppers adapted for mounting on a mobile platform for facilitating the distribution of pulverulent solid fertilizer.

2. Brief Description of the Prior Art

Dry fertilizer has heretofore been widely used in agriculture. For the purpose of distributing fertilizer granules or pellets over a large area, mobile vehicles have been provided which carry upon a rearwardly extending bed, a steel container or hopper which is generally configured as a frustum of an inverted pyramid having upwardly extending side walls and end walls secured to the upper edges of the convergent frustoconical walls of the lower portion of the hopper. Extending along the bottom of the hopper in a position to receive the fertilizer pellets therefrom is an endless belt conveyor which functions to move the fertilizer through a metering gate located at one end of the hopper. After the fertilizer passes through the metering gate on the endless belt conveyor, it is discharged onto a pair of rotating spreader or spinner plates which carry blades functioning to throw or propel the fertilizer pellets outwardly over a large area as the vehicle moves forward.

The gauge of steel plate from which fertilizer hoppers of the type described have previously been made has, of necessity, been such that although the hopper is relatively heavy in its overall weight, the thinness of the plates permits them to become more easily bent and buckled over extended periods of usage when the hopper is loaded to capacity. It is also characteristic of the metal from which the hoppers have been previously constructed that the metal becomes corroded and weakened by contact with the alkaline chemicals of the fertilizer as residual amounts of the fertilizer remain in the hopper and become dampened by rain or moisture. This corrosion of the walls of the hopper requires relatively frequent maintenance during which the walls are sandblasted and repainted. Moreover, over a relatively short operating life span, the thinness of the metal due to the corrosion and refinishing described becomes such that the hopper must be replaced.

In prior constructions of fertilizer hoppers of the type described, the fertilizer supporting upper run of the endless belt conveyor has passed over a series of horizontally spaced angle irons which extend across the bottom of the hopper between the runs of the conveyor belt. When the belt is loaded with fertilizer, the belt tends to develop a catenary or sag between the spaced angles, and a substantial amount of drag, as well as frictional wear, is developed as the belt slides across the angles during its horizontal movement for discharging fertilizer. Moreover, a very marked tendency has existed in prior constructions for excessive drag to be developed at such time as any moisture accumulates on the lower surface of the upper run of the conveyor belt due to the sticking tendency of the belt as it passes over the spaced angles which have been described. The drag imposed by this sticking tendency on the motor used to actuate the belt shortens the service life of the motor, as well as developing excessive stress on other mechanisms employed in the conveyor system. This propensity for excessive dragging when moisture accumulates on the lower surface of the conveyor belt is amplified in those instances where a flat steel plate is used as the bottom of the hopper and is positioned beneath the fertilizer supporting run of the belt.

BRIEF DESCRIPTION OF THE PRESENT INVENTION

The present invention is directed to an improved long-life fertilizer hopper which is constructed of a relatively lightweight material which nevertheless, by reason of the structural components employed, is of enhanced strength and durability, and can be operated with less power and less wear on the belt conveying system used for moving the fertilizer to the discharge end of the hopper.

Broadly described, the fertilizer spreader box of the invention comprises an inverted frusto-pyramidally shaped hopper having inclined opposed side walls and inclined opposed end walls which are convergent toward the bottom of the hopper. At the upper edges of the inclined side and end walls, vertically extending flanges or top walls are formed completely around the upper periphery of the hopper and define a large opening at the upper side thereof. An endless belt conveyor is positioned in the lower portion of the hopper at the convergent ends of the side and end walls and passes across a bottom wall which is formed in the hopper. The bottom wall is characterized by a construction which, by its geometry, permits air flow beneath the upper run of the endless belt which passes over this wall, and also minimizes frictional drag between the belt and the bottom wall. The upper run of the belt extends through openings in the hopper at the lower edges of each of the opposed end walls of the hopper, and the lower run of the belt passes beneath the bottom wall of the hopper and certain wall supporting members hereinafter described.

A plurality of saddle plates are supportingly connected to the outer side of the two side walls of the hopper and extend downwardly therefrom. A pair of hydraulic fluid tanks extend along the lower edges of the side walls of the hopper and are secured to the lower ends of the saddle plates. A plurality of transverse channel members are connected between the hydraulic fluid tanks and extend transversely across the hopper under the bottom wall thereof. A plurality of horizontally spaced, longitudinally extending supporting rods are positioned between the channel members and the bottom wall of the hopper to support the bottom wall upon the channel members. Protective sealing flaps project downwardly from the lower portions of the convergent side walls of the hopper and sealingly overlap the longitudinal edges of the conveyor belt.

In a preferred construction of the fertilizer spreader box of the invention, the entire hopper is constructed of a fiberglass material having a paper honeycomb reinforcing layer imbedded in the fiberglass side walls of the hopper for imparting high strength and durability thereto.

An important advantage of the present invention is to provide a fertilizer spreader box which is adapted to be quickly mounted and demounted from a mobile supporting structure, such as a truck bed, and which is of relatively light weight, yet possesses high mechanical strength, and is characterized in having an extended trouble-free operating life.

A further object of the invention is to provide a fertilizer spreader box which is constructed of a material highly resistant to corrosion from the usual fertilizer materials or aqueous solutions thereof.

Another object of the invention is to provide a fertilizer spreader box of generally frusto-pyramidal configuration in which convergent side and end walls function to feed a dry fertilizer material onto a moving belt conveyor disposed at the bottom side of the hopper and functioning to move fertilizer pellets through a metering opening provided in one of the end walls of the hopper, which fertilizer box is constructed to reduce the wear upon the conveying belt and reduce the power required to remove large amounts of fertilizer out of the hopper on the conveyor belt.

An additional and further object of the invention is to provide a hopper which is less susceptible to mechanical malfunction and which assures that substantially all of a dry pulverulent fertilizer stored in the hopper will ultimately be dispensed upon a moving conveyor located at the bottom of the hopper, rather than being lost through infiltration to the underside of the conveyor belt by undesirable leakage or passage around the outer edges of the conveyor belt.

Additional objects and advantages of the invention will become apparent as the following detailed description of a preferred embodiment of the invention is read in conjunction with the accompanying drawings which illustrate such preferred embodiment.

GENERAL DESCRIPTION OF THE DRAWINGS

FIG. 1 is a side elevation view of a fertilizer spreader box constructed in accordance with the present invention and showing a portion of one corner of the spreader box cut away in order to illustrate certain structure disposed on the interior of the box.

FIG. 2 is a plan view of the fertilizer spreader box of the invention, again having certain parts broken away in order to better illustrate certain underlying structure, the manner in which the side walls of the box are constructed and other structural aspects of the box. In FIG. 2, the endless conveyor belt normally disposed at the lower side of the hopper has been removed for clarity of illustration and explanation.

DETAILED DESCRIPTION OF A PREFERRED EMBODIMENT OF THE INVENTION

Figure 1:
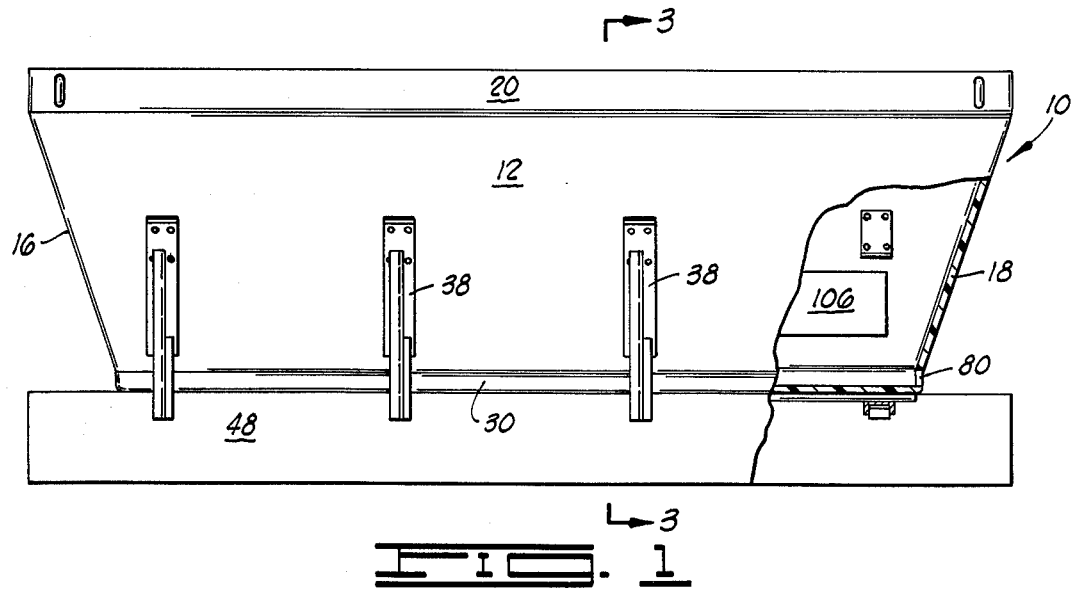

Referring to the drawings, the fertilizer spreader box of the invention includes a hopper designated generally by reference numeral 10 which is adapted, in a manner hereinafter described, to be mounted upon a mobile structure, such as a truck bed or trailer which is equipped with fans or rotating spreader blades disposed at one end of the hopper for receiving dry fertilizer pellets therefrom and distributing them over a large area. The hopper 10 includes a lower portion which is of inverted, frusto-pyramidal configuration and includes a pair of inwardly sloping side walls 12 and 14 and a pair of inwardly sloping, convergent end walls 16 and 18. At its upper side, the hopper 10 is connected to a plurality of vertically extending flanges or top walls 20, 22, 24 and 26. The convergent side walls 12 and 14 each have formed at the lower edges thereof, a vertically downwardly extending lateral belt channel wall, with these walls being denominated by reference numerals 28 and 30, respectively. The hopper 10 further includes a specially constructed bottom wall 32 which is joined at its lateral edges to the walls 28 and 30 and extends from one end of the hopper to the other.

Figure 2:
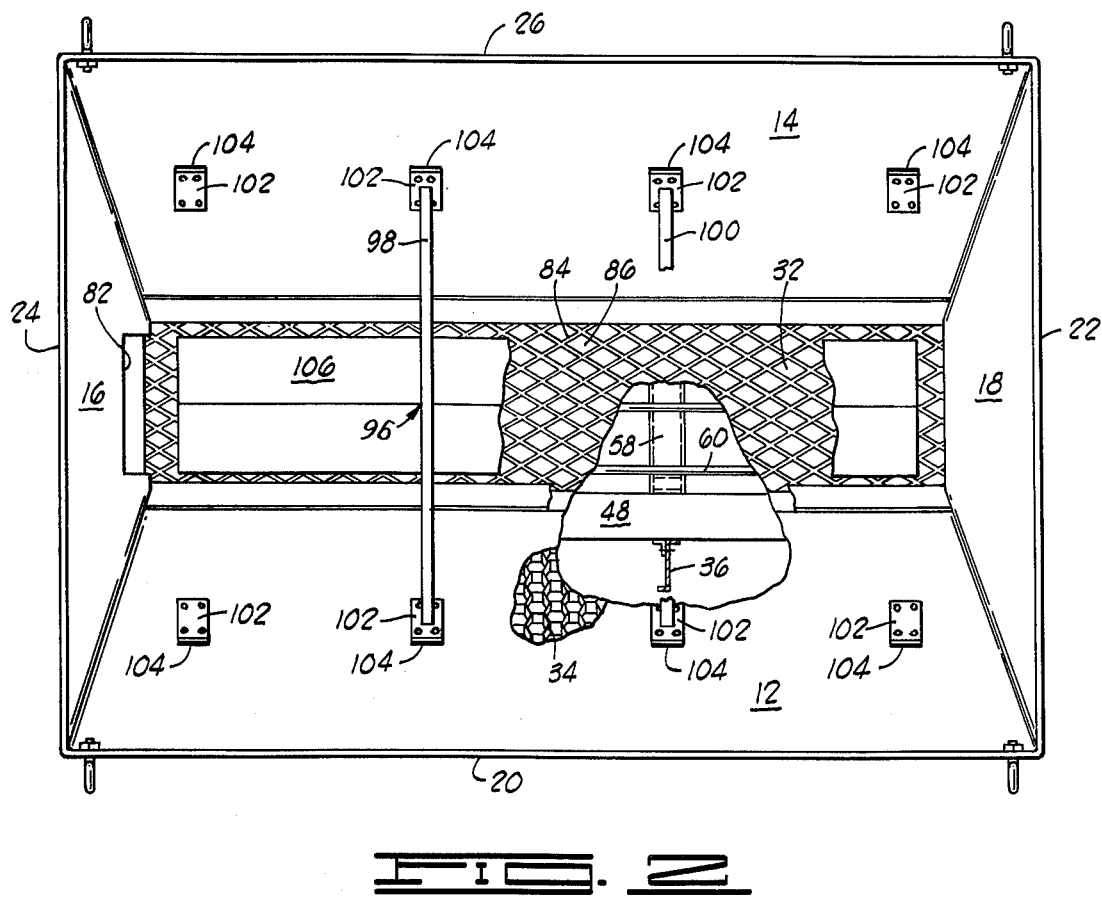

In a preferred construction of the invention, the several walls of the hopper, denominated by reference numerals 12-32, and which have hereinbefore been described, are integrally formed so that the hopper is a unitary member susceptible to being molded from a synthetic resin. A preferred construction of the hopper is that in which the several walls described constitute a fiberglass molded body. Further with respect to the preferred construction of the invention, the downwardly sloping walls 12 and 14 each have embedded in the fiberglass of the walls a layer or lamina 34 of reinforcing paper or other semi-rigid cellulosic material which is pre-shaped in a honeycomb configuration as best illustrated in FIG. 2. The honeycomb-configured paper layer 34 includes webs of paper which are interconnected to define hexagonal openings or voids through the paper layer, giving rise to the honeycomb configuration of the layer. The function of the paper layer 34 which is embedded in the fiberglass walls 12 and 14 is to impart high strength to the hopper, and to increase its durability and service life.

For the purpose of facilitating the reinforcement of the hopper 10, and more particularly, its stable mounting upon a mobile platform such as a truck bed or trailer, a plurality of trapezoidally shaped saddle plates 36 are mounted at horizontally spaced locations on opposite sides of the hopper. An upper edge of each of the saddle plates 36 is welded to an abutment plate 38 (see FIG. 1). The angle of cut of this upper edge of each saddle plate 36 and the angle of inclination of the abutment plates 38 is such that the plates can be abutted against a rubber sealing pad or gasket 40 interposed between the abutment plate 38 and the outer side wall or outer surface of the respective side wall 12 or 14 of the hopper. The abutment plates 38 are secured to the side walls 12 and 14 of the hopper 10 in a manner hereinafter described.

At its lower end, each saddle plate 36 is bolted to an angle plate 42 disposed at the lower inner edge of the respective saddle plate. A flange 42b of each angle plate 42 includes a pair of elongated slots 44 for accommodating bolts by which it is bolted to its respective saddle plate 36. The position of the flange 42b of each of the angle plates in relation to the inner edge of the respective saddle plate 36 can thus be adjusted. The other flange 42a of each angle plate 42 is bolted or preferably welded to the outer side of a proximately located one of a pair of longitudinally extending hydraulic power fluid tanks designated generally by reference numerals 46 and 48.

The hydraulic power fluid tanks 46 and 48 are substantially rectangular in cross-section and are characterized in having a pair of opposed, substantially parallel side walls 50 and 52. Welded or suitably bolted to the inner side walls 52 of each of the hydraulic fluid tanks 46 and 48 are a plurality of angle brackets 56. Each angle bracket 56 includes a horizontally extending inwardly projecting flange carrying a pair of bolt holes, and a vertically extending flange which is secured to the facing surface of the respective inner wall 52 of the adjacent hydraulic tank.

Figure 5:
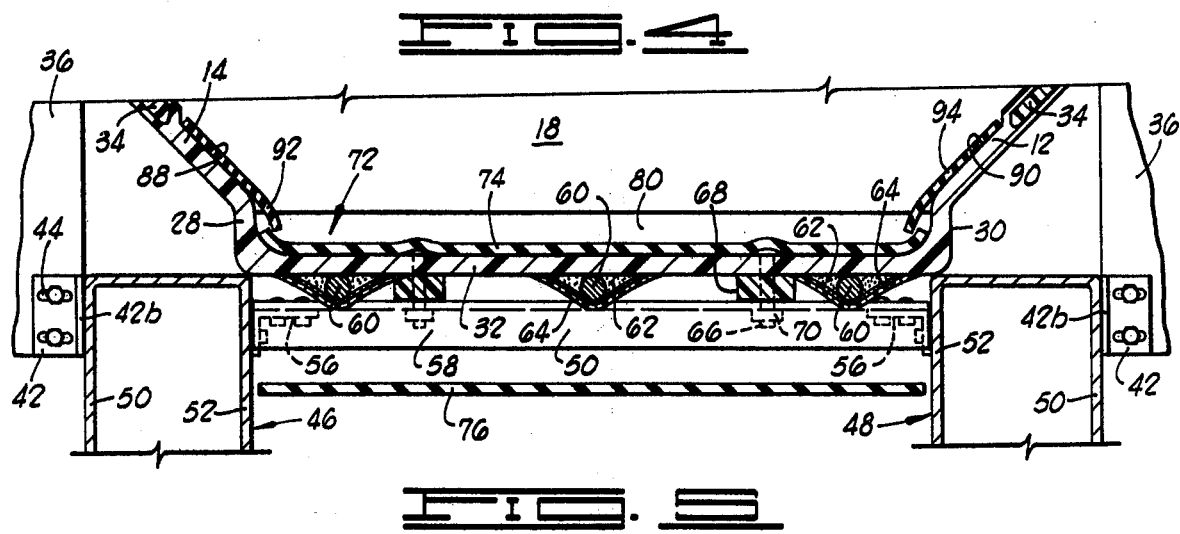
FIG. 5 is an enlarged sectional view illustrating certain details of structure of the fertilizer spreader box of the invention, with such section being taken transversely across the lower portion of the fertilizer spreader box at about the center thereof.

The angle brackets 56 which are secured to the wall 52 of the two hydraulic fluid tanks 46 and 48 are transversely aligned in pairs across the bottom of the hopper 10, and in such array function to structurally support transverse channel members 58 which are of C-shaped cross-sectional configuration. The horizontal, inwardly extending flange of each of the angle brackets 56 projects between the parallel flanges of the respective transverse channel member 58 and is bolted to the underside of the web portion of the respective channel member as best illustrated in FIGS. 1 and 5.

For the purpose of providing reinforcement and support for the bottom wall 32 of the hopper 10, a plurality of longitudinally extending, horizontally spaced rods 60 are extended in parallel relation beneath the bottom wall 32 and in contact therewith. The rods 60 are secured in this position by building up around the sides of the wall with a suitable filler material 62 and then covering the filler material and rod with a fiberglass sheath or cover 64. The rods 60 are thus structurally reinforced, but more importantly are protected from corrosion, wear and abrasion. When the longitudinally extending rods 60 have been secured to the downwardly facing surface of the bottom wall 32 in the manner described, the hopper 10 with the rods attached thereto is then positioned over the channels 58 so that the longitudinally extending rods and the fiberglass sheath 64 which covers these rods rests upon the upwardly facing web portions of the several channels 58. Bolts 66 are then projected through the bottom wall 32 from the upper side thereof, through suitable elastomeric washers or sealing gasket structures 68 and ultimately through registering or aligned holes formed in the web portion of each of the transverse channel members 58. The bolts are retained in this position by suitable nuts 70 threaded onto the lower end of the bolt shanks as shown in FIG. 5.

For the purpose of moving a pulverulent or particulate dry fertilizer material from the interior of the hopper 10 to a position outside the hopper where the fertilizer can be distributed by means of rotating distributor blades, an elongated, endless belt conveyor designated generally by reference numeral 72 is provided. The endless belt conveyor 72 includes a horizontally extending upper run 74 and a horizontally extending lower run 76. It will be noted in referring to FIG. 5 that the upper run 74 of the endless belt 72 is supported upon the upper surface of the bottom wall 32 and extends to the outer lateral edges of this wall and laps slightly over and upwardly on the lateral belt channel walls 28 and 30. The lower run 76 of the endless belt 72 extends beneath the supporting transverse channel members 58 and between the hydraulic fluid tanks 46 and 48.

Figure 3:
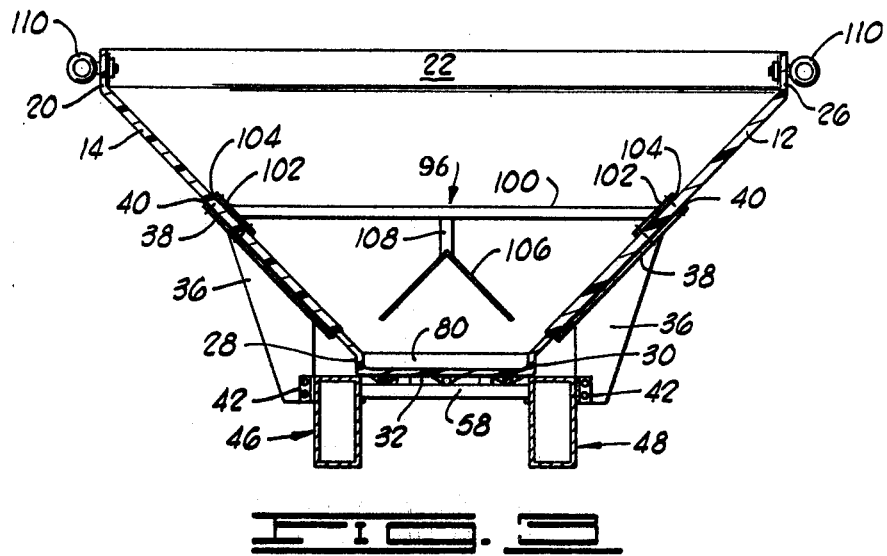
FIG. 3 is a sectional view taken along line 3—3 of FIG. 1.
Figure 4:
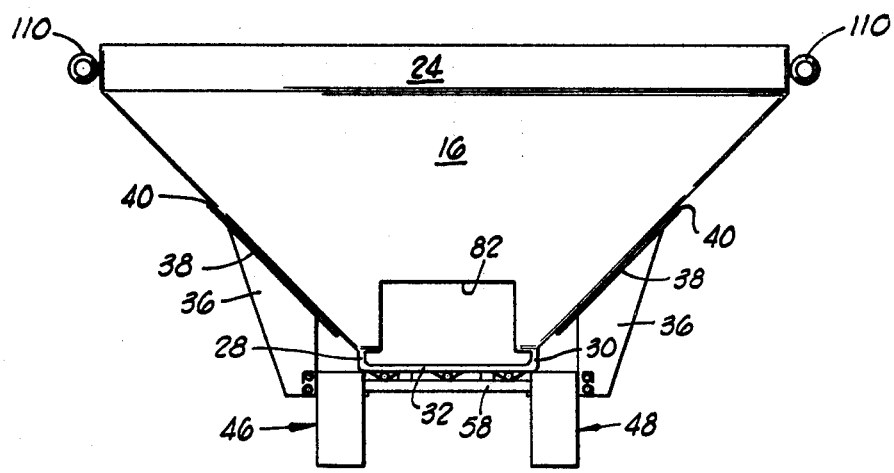
FIG. 4 is an end elevation view of one end of the fertilizer spreader box of the invention.

At that end of the hopper 10 which is defined by the end wall 18, and which will be hereinafter referred to as the forward wall, an elongated transversely extending slot 80 is defined between the lower edge of this end wall and the bottom wall 32 (see FIGS. 1 and 3). The upper run 74 of the endless belt 72 passes through the slot 80 at the forward end of the hopper 10 and around a driven roller (not shown) which constitutes no part of the present invention and is conventional in construction. After traversing the described roller, the belt 72 reverses direction and the lower run 76 is guided and directed to the position beneath the transverse channel members 58 shown in FIG. 5.

At the opposite end of the hopper 10 (hereinafter referred to as the rear end), a relatively large slot or opening 82 is formed in the end wall 16 and projects upwardly into this wall a substantial distance from the bottom wall 32 of the hopper. This opening is adjustably closed during operation and use of the fertilizer spreader box by means of a sliding gate which can be conventionally mounted and is of conventional construction. The degree to which this gate which is supported on the end wall 16 is raised or lowered will determine the rate at which the dry fertilizer is metered as it is moved out of the hopper 10 through the opening 82 during the use of the apparatus.

Referring to FIG. 2 of the drawings, it will be perceived that the upper surface of the bottom wall 32 of the hopper 10 is characterized in having a diamond pattern form thereon. The diamond pattern results from the formation in the surface of the bottom wall 32 of a plurality of diagonally intersecting grooves 84 which bound diamond-shaped areas 86 disposed contiguously over the length and breadth of the upper surface of the bottom wall. Each of the diamond-shaped areas 86 has a stippled or textured upper surface which gives it an eggshell type of texture.

It is across the diamond-patterned upper surface of the bottom wall 32 that the upper run 74 of the endless belt conveyor 72 moves as it is actuated for unloading the fertilizer from the hopper. The geometric configuration and construction of this surface of the bottom wall 32 allows air to circulate under the upper run 74 of the conveyor belt and to thus prevent the accumulation of moisture at this location. Moreover, the diamond pattern, together with the stippled surface of the exposed upper sides of the diamond-shaped surfaces, reduces the frictional drag resulting from the movement of the upper run of the conveyor across the contacting surface of the bottom wall.

As illustrated in FIG. 5 of the drawings, the upper run 74 of the endless belt conveyor 72 extends all the way across the transverse width of the bottom wall 32 of the hopper 10 and includes lateral edges which lap up over the lower portion of each of the two lateral belt channel walls 28 and 30. It will further be perceived in referring to FIG. 5 that the lower portion of each of the inwardly sloping side walls 12 and 14 is characterized in having inset surfaces 88 and 90 which extend to the inner upper sides of the two lateral belt channel walls 28 and 30. Secured to these surfaces 88 and 90 are a pair of seal flaps 92 and 94 which project downwardly past the terminus of each inset surface 88 and 90 to a location at which the lower edge of each seal flap extends over and overlaps the respective outer or lateral edge of the upper run 74 of the endless belt conveyor 72. As can be seen from FIG. 5, the thickness of each of the seal flaps 92 and 94 is approximately equivalent in dimension to the extent of offset of the inset surfaces 88 and 90 from the major plane of the respective internal wall surface of the two inwardly sloping side walls 12 and 14 of the hopper 10.

Positioned within the hopper 10 is a baffle plate or feed bar assembly designated generally by reference numeral 96. The baffle plate assembly 96 includes a pair of transversely extending rods 98 and 100 which extend between the side walls 12 and 14 of the hopper, and are welded or otherwise suitably secured at their opposite ends to abutment plates 102 (see FIG. 2). The abutment plates 102 bear flatly against mounting pads 104 of resilient material and are bolted through these pads and the side walls 12 and 14 to the abutment plates 38 carried on the four centrally located saddle plates 36. It may be here pointed out that the abutment plates 38 carried on the saddle plates 36 which are disposed on opposite sides of the hopper 10, and at the opposite ends thereof, are simply bolted through their respective rubber sealing pads 40 and through the adjacent walls 12 and 14 of the hopper. The transverse rods 98 and 100 function to suspend a V-shaped baffle plate 106 within the lower central portion of the hopper 10. This is accomplished by means of channels 108 or other suitable members welded to the lower side of each of the rods 98 and 100, and to the angle or apex formed at the intersection of the two divergent flanges of the baffle plate 106.

For the purpose of enabling the hopper 10 to be lifted and placed in transport position on a vehicle, an eye bolt 110 is secured through each of the opposite ends of each of the vertically extending top walls 20 and 26.

Use and Operation

In the use and operation of the fertilizer spreader box, the box without the feed bar assembly 96 mounted on the inside thereof is initially lifted by suitable slings connected to the eye bolts 110, and is positioned on the chassis of the truck with the hydraulic fluid tanks 46 and 48 resting upon the chassis. Suitable connecting members, such as angles (not shown), are welded to the saddle plates 36 for retaining the hopper 10 in a fixed position on the truck chassis. The feed bar assembly 96 is then set down in position within the hopper 10 and is bolted in the illustrated position. The hydraulic connections for operating the spreader blades, and for driving the endless belt conveyor, are then connected to the hydraulic fluid tanks and to controls located in the cab of the vehicle. Operation of the system can then be commenced after the hopper has been filled with a dry pulverulent fertilizer.

In the operation of the system, the baffle plate 106 functions to support a portion of the load of fertilizer within the hopper, and relieve the belt of loading to some extent. It also functions to afford uniform distribution of the fertilizer, and equal distribution of weight on the conveyor belt.

When the endless belt conveyor 72 is energized, fertilizer is moved thereon through the opening 82 formed in the end wall 16 of the hopper with the amount of fertilizer so moved being metered. The drag which develops between the moving upper run 74 of the conveyor belt and the bottom wall 32 is relatively low compared to prior structures as a result of the geometric configuration and construction of the upper surface of the bottom wall of the hopper. Moreover, as the belt moves, the loss of fertilizer pellets by infiltration under the upper run 74 of the endless belt conveyor 72 is minimized as a result of the protective and sealing action of the sealing flaps 92 and 94. Further, the inclusion of elastomeric or synthetic resin sealing flaps at this location minimizes wear on the lateral edges of the conveyor belt, and assures a relatively long and trouble-free operating life for the conveyor.

The manner in which the hopper is constructed and supported assures that it has high mechanical strength and excellent durability and freedom from malfunction. The strength of the hopper is quite high in relation to the overall weight thereof, and it is relatively immune to corrosive attack by substantially all types of fertilizer which may be loaded therein.

Although a preferred embodiment of the invention has been herein illustrated and described, it will be understood that various changes and innovations in the described and illustrated structure can be effected without departure from the basic principles which underlie the invention. Changes and innovations of this type are therefore deemed to be circumscribed by the spirit and scope of the invention, except as the same may be necessarily limited by the appended claims or reasonable equivalents thereof.

What is claimed is:

1. A box for containing and spreading fertilizer comprising:
   a hopper of inverted, frusto-conical configuration, said hopper including convergent, inwardly sloping side walls, and convergent, inwardly sloping end walls;
   a plurality of saddle plates connected to the outer sides of each of said side walls and projecting downwardly therefrom;
   a pair of tanks connected to lower end portions of said saddle plates and extending along the lower portion of said hopper along the outer sides thereof;
   a plurality of horizontally spaced members extending transversely across and beneath said hopper and each having its opposite ends connected to said tanks;
   a plurality of horizontally spaced, elongated rods extending longitudinally of, and beneath, said hopper and supported on said horizontally spaced members;
   a bottom wall in said hopper and supported on said horizontally spaced, elongated rods; and
   an endless belt conveyor including an upper run projecting over, and supported by, the bottom wall of said hopper, and including portions extending through openings at opposite ends of said hopper.

2. A box for containing and spreading fertilizer as defined in claim 1 wherein said bottom wall is a synthetic resin and said elongated rods are sheathed in synthetic resin bonded to said bottom wall.

3. A box for containing and spreading fertilizer as defined in claim 1 and further characterized as including flexible sealing flaps secured to the inner side of each of said side walls and projecting downwardly into overlapping relation to the opposite sides of the upper run of said endless belt conveyor.

4. A box for containing and spreading fertilizer as defined in claim 1 wherein said side and end walls are synthetic resin and said box is further characterized in including a honeycomb-shaped paper lamina embedded in and reinforcing each of said side walls.

5. A box for containing and spreading fertilizer as defined in claim 1 and further characterized as including a vertically extending lateral belt channel wall connected to and extending downwardly from the lower edge of each of said side walls, said belt channel walls being positioned on opposite sides of said upper run of said endless belt conveyor.

6. A box for containing and spreading fertilizer as defined in claim 5 wherein the side walls, end walls, bottom wall and belt channel walls of said box are integrally formed of synthetic resin as a unitary hopper.

7. A box for containing and spreading fertilizer as defined in claim 1 and further characterized as including a feed bar assembly mounted between said side walls inside said box and including:

a plurality of transversely extending rods having opposite ends secured to said side walls; and a baffle plate of inverted V-shaped cross-sectional configuration supported by said transversely extending rods over the upper run of said conveyor.

8. A box for containing and spreading fertilizer as defined in claim 7 wherein said transversely extending rods are connected through said side walls to a plurality of said saddle plates.

9. A box for containing and spreading fertilizer as defined in claim 1 wherein said bottom wall includes an upper surface portion having a plurality of raised areas thereon separated by diagonally intersecting grooves.

10. A box for containing and spreading fertilizer as defined in claim 9 wherein said bottom wall is a synthetic resin and said elongated rods are sheathed in synthetic resin bonded to said bottom wall.

11. A box for containing and spreading fertilizer as defined in claim 10 and further characterized as including a vertically extending lateral belt channel wall connected to and extending downwardly from the lower edge of each of said side walls, said belt channel walls being positioned on opposite sides of said upper run of said endless belt conveyor.

12. A box for containing and spreading fertilizer as defined in claim 11 wherein said side walls, end walls, bottom wall and belt channel walls of said box are integrally formed of synthetic resin as a unitary hopper.

13. A box for containing and spreading fertilizer as defined in claim 12 and further characterized as including flexible sealing flaps secured to the inner side of each of said side walls and projecting downwardly into overlapping relation to the opposite sides of the upper run of said endless belt conveyor.

14. A box for containing and spreading fertilizer as defined in claim 13 and further characterized as including a honeycomb-shaped paper lamina embedded in and reinforcing each of said side walls.

15. A box for containing and spreading fertilizer as defined in claim 14 and further characterized as including a feed bar assembly mounted between said side walls inside said box and including:

a plurality of transversely extending rods having opposite ends secured to said side walls; and a baffle plate of inverted V-shaped cross-sectional configuration supported by said transversely extending rods over the upper run of said conveyor.

16. A box for containing and spreading fertilizer as defined in claim 15 wherein said transversely extending rods are connected through said side walls to a plurality of said saddle plates.

17. A box for containing and spreading fertilizer as defined in claim 16 wherein said upper belt run is further characterized in including side edges bounding said opposite sides and projecting under the lower edges of said side walls.

18. Apparatus for containing and dispensing fertilizer comprising:
a hopper including
a pair of downwardly extending inwardly convergent opposed side walls;
end walls extending between said side walls; and
a bottom wall extending between said side walls, said bottom wall including a plurality of raised areas separated by intersecting grooves collectively arranged in a diamond pattern on the upper surface thereof; and
an endless belt conveyor including
an upper belt run extending along and supported by the upper surface of said bottom wall; and
a lower belt run passing under said bottom wall.

19. Apparatus for containing and dispensing fertilizer as defined in claim 18 wherein said upper belt run is further characterized in including side edges projecting under the lower edges of each of said side walls.

20. Apparatus for containing and dispensing fertilizer as defined in claim 19 and further characterized as including seal flaps secured to the lower portions of said side walls, and projecting downwardly over said upper belt run in overlapping relation to said side edges.

21. Apparatus for containing and dispensing fertilizer as defined in claim 18 and further characterized as including a feed bar assembly mounted in said hopper and supported between said side walls, said feed bar assembly including
a baffle plate being suspended from a plurality of transversely extending rods which extend between said side walls of said hopper;
an abutment plate secured to each end of each of said transversely extending rods; and
means for securing said abutment plates to said side walls including resilient mounting pads between each of said abutment plates and said side walls.

22. A dry fertilizer hopper comprising:
downwardly convergent, opposed fiberglass side walls;
downwardly convergent, opposed fiberglass end walls extending between and formed integrally with said side walls and forming therewith a frustum of an inverted cone;
vertically extending fiberglass top walls projecting upwardly from, and formed integrally with, said side and end walls;
a lateral belt channel fiberglass wall formed integrally with each of said side walls at the lower edge thereof and projecting vertically downwardly therefrom;
a horizontally extending fiberglass bottom wall extending between and formed integrally with said lateral belt channel walls;
said walls all being integrally formed and interconnected to form a single unitary container;
a honeycomb-shaped lamina of reinforcing material embedded in each of the side walls; and
an endless belt conveyor including portions projecting out of opposite ends of said container beneath said end walls, said endless belt conveyor including an upper run extending over said bottom wall and between said lateral belt channel walls.

23. A dry fertilizer hopper as defined in claim 22 and further characterized as including eye-bolts extending through a plurality of said top walls and facilitating lifting and lowering said hopper.

24. A dry fertilizer hopper as defined in claim 22 and further characterized as including means for supporting said hopper on, and attaching said hopper to, a vehicle.

25. Apparatus for containing and dispensing fertilizer comprising:
a hopper including
a pair of downwardly extending, inwardly convergent opposed side walls;
end walls extending between said side walls; and
a bottom wall extending between said side walls, said bottom wall including a plurality of raised areas separated by intersecting grooves on the upper surface thereof, the surface of said raised areas having a stippled, eggshell texture; and
an endless belt conveyor including
an upper belt run extending along, and supported by, said upper surface of said bottom wall; and
a lower belt run passing under said bottom wall.

* * * * *